United States Patent
Clayton et al.

(10) Patent No.: US 6,873,571 B2
(45) Date of Patent: Mar. 29, 2005

(54) DIGITAL AIR GUN SOURCE CONTROLLER APPARATUS AND CONTROL METHOD

(75) Inventors: David A. Clayton, Seabrook, TX (US); Shyam Kutty, Houston, TX (US); Allen Nance, Fredericksburg, TX (US)

(73) Assignee: Input/Output, Inc., Stafford, TX (US)

( * ) Notice: Subject to any disclaimer, the term of this patent is extended or adjusted under 35 U.S.C. 154(b) by 0 days.

(21) Appl. No.: 10/388,243

(22) Filed: Mar. 13, 2003

(65) Prior Publication Data

US 2004/0032794 A1 Feb. 19, 2004

Related U.S. Application Data

(60) Provisional application No. 60/363,984, filed on Mar. 14, 2002.

(51) Int. Cl.[7] ................................................ G01V 1/38
(52) U.S. Cl. ...................................................... 367/144
(58) Field of Search .......................... 367/144, 15, 23; 181/120; 251/129, 129.02

(56) References Cited

U.S. PATENT DOCUMENTS

| | | | |
|---|---|---|---|
| 4,476,553 A | 10/1984 | Ziolkowski et al. | 367/144 |
| 4,757,482 A | 7/1988 | Fiske, Jr. | 367/144 |
| 4,852,071 A | 7/1989 | Otto | 367/144 |
| 4,868,794 A | 9/1989 | Ziolkowski et al. | 367/23 |
| 5,184,329 A | 2/1993 | Regnault et al. | 367/23 |
| 5,200,927 A | 4/1993 | Cretin et al. | 367/13 |
| 5,202,669 A * | 4/1993 | Ishimochi et al. | 345/26 |
| 5,212,669 A | 5/1993 | Jenkins | 367/144 |
| 5,530,678 A | 6/1996 | Kosalos | 367/13 |
| 5,548,562 A | 8/1996 | Helgerud et al. | 367/14 |
| 5,615,170 A | 3/1997 | Chelminski | 367/15 |
| 6,061,635 A | 5/2000 | Barber, Sr. | 702/14 |
| 6,081,765 A | 6/2000 | Ziolkowski | 702/17 |
| 6,510,270 B1 | 1/2003 | Toth et al. | 385/129 |
| 6,525,658 B2 | 2/2003 | Streetman et al. | 340/522 |
| 2002/0196140 A1 | 12/2002 | Streetman et al. | 340/523 |

OTHER PUBLICATIONS

M. H. Safar; *Calibration of Marine seismic Sources Using a Hydrophone of Unknown Sensitivity*, Geophysical Prospecting, vol. 24, pp. 329–333, 3 Figs., 1 Table.

* cited by examiner

*Primary Examiner*—Daniel Pihulic
(74) *Attorney, Agent, or Firm*—Madan, Mossman & Sriram, P.C.

(57) ABSTRACT

An in-water distributed control system for use in marine seismic survey. The system includes a shipboard interface and power supply coupled to an in-water subsystem via a high bandwidth communication link. The in-water subsystem includes a remote control module for generating firing commands based on synchronizing and position parameters transmitted by the interface. The remote control module transmits power, data, and commands to a plurality of gun control modules. Each gun control module operates an air gun. An individually addressable remote cut-off valve controls air to each air gun. Depth and pressure at the gun control module is sensed by at least one DT/PT module. An optional expansion unit provides additional DT/PT capability.

18 Claims, 8 Drawing Sheets

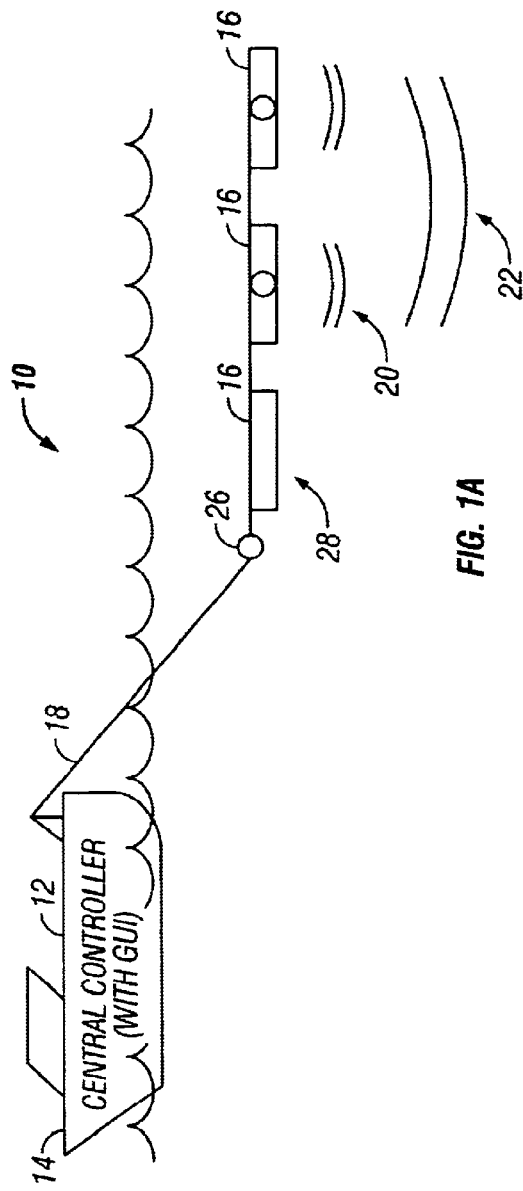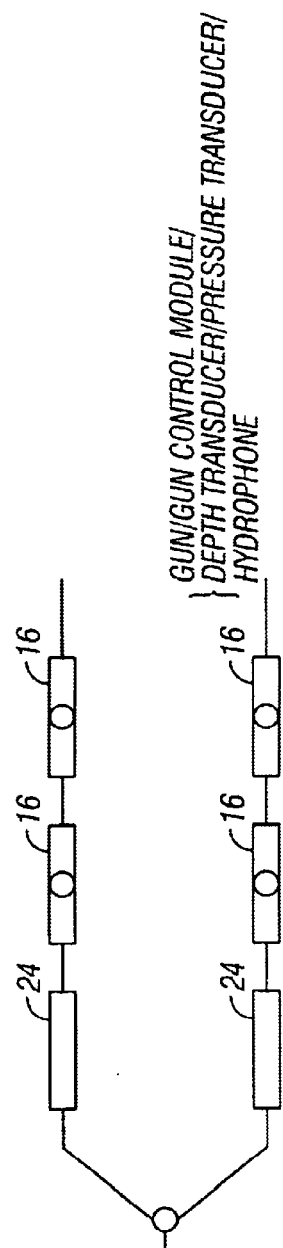
FIG. 1A
FIG. 1B

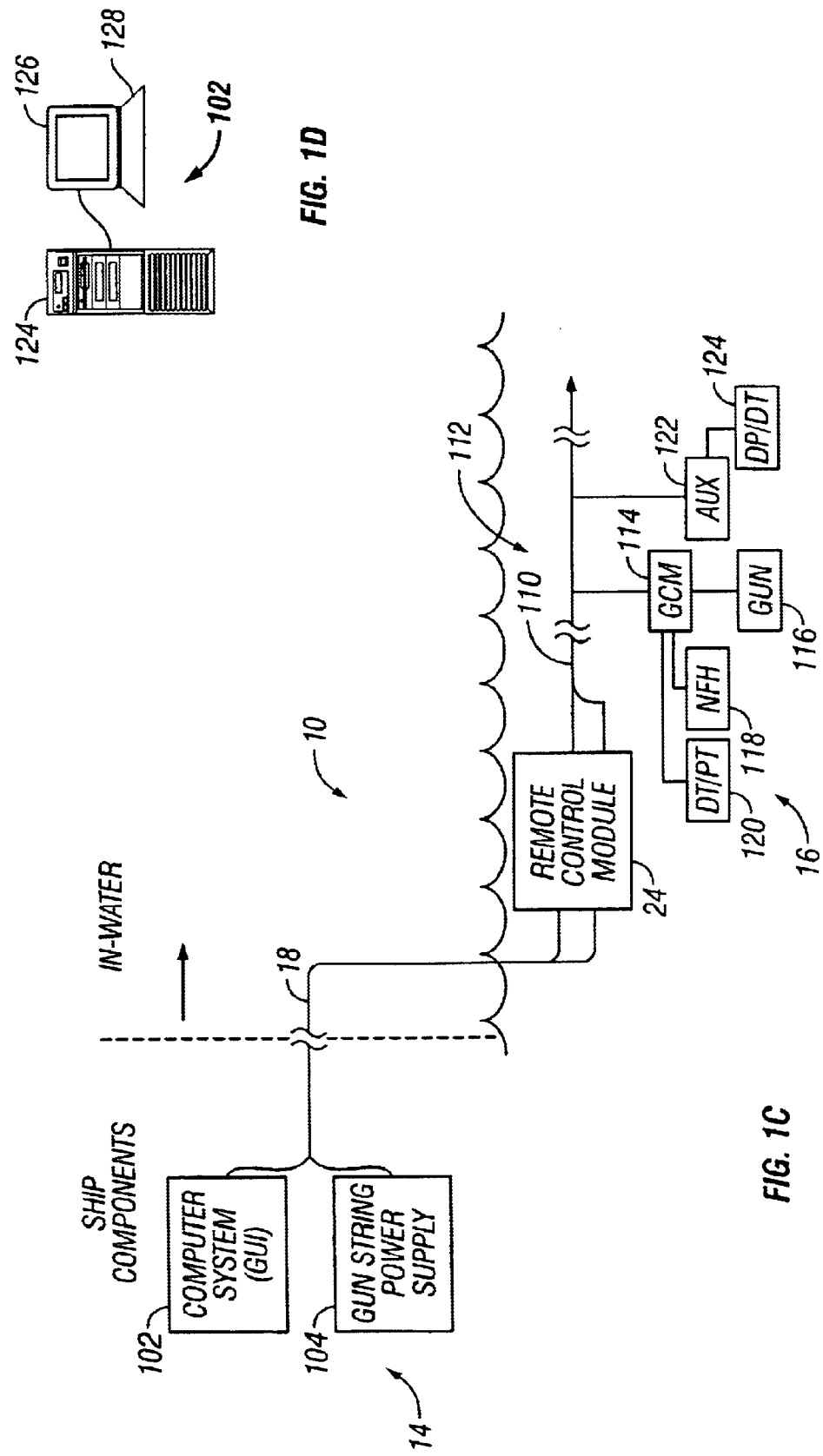

DIGITAL AIR GUN SOURCE CONTROLLER APPARATUS AND CONTROL METHOD

This application is related to provisional patent application Ser. No. 60/363,984 filed on Mar. 14, 2002, the entire contents of which application is hereby incorporated herein by reference.

BACKGROUND OF THE INVENTION

1. Field of the Invention

This invention relates generally marine seismic surveys and more particularly to an apparatus and method for controlling marine seismic sources such as an array of air guns.

2. Description of the Related Art

In marine seismic surveying, to obtain geophysical information relating to the substrata located below the sea bottom, seismic sources, generally acoustic transmitters, adapted to produce pressure pulses or shock waves under water, are towed beneath the water surface behind a marine vessel. The shock waves propagate into the substrata beneath the sea where they are refracted and reflected back to the sea. Sensors (usually hydrophones) are used to detect the returning shock waves and to output signals indicative of the detected wave. The signals are processed to generate useful data and to determine the geophysical structure of the substrata.

Air guns or gas guns are frequently used as acoustic transmitters. Usually, several air guns are placed in spaced relation to each other in a subarray. One or more air gun subarrays are towed behind a marine vessel beneath the sea surface. During operation, all air guns in a subarray are activated simultaneously to produce a desired overall pressure pulse from that subarray. The pulse characteristics, such as the frequency, bubble ratio and amplitude, of the overall pressure pulse produced by an air gun subarray is a function of the characteristics of the pressure pulses produced by the individual air guns and the physical arrangement of the air guns in that air gun subarray.

A typical gun controller includes a shipboard central controller and an umbilical leading out to the array. The umbilical typically includes multiple data conducting wires, power conductors, air conduits and a strength member such as a heavy cable. These umbilical conductors typically limit the number of towed sources and limit the amount of offset between the ship and array, because the large size and weight of the umbilical tends to present unacceptable drag when towed.

Air gun sources are preferably activated simultaneously. And shipboard controllers have been improved over the years to help ensure simultaneous activation (or firing) of the air guns. One such system is described in U.S. Pat. No. 4,757,482 to Fisk and having the title "Modular Airgun Array Method, Apparatus and System", the '482 patent. That patent describes an air gun control system having a central controller on the ship with a data bus leading to several sources aligned in an array and towed behind the ship. The controller of the '482 patent provides some in-water control features by the use of a plurality of local control modules that perform power conversion and are individually addressable by the shipboard central controller.

The industry is tending toward higher bandwidth systems, because there is a need for larger arrays and a need for acquiring larger amounts of seismic information. Some proposed systems include fiber optic data communication that will greatly increase data bandwidth for systems designed to operate using fiber optic conductors. A drawback of these systems includes the failure to recognize the need to utilize existing seismic hardware. Cables currently used are very costly, thus it is not cost effective to discard perfectly good cable hardware. Additionally, even these proposed systems suffer from unnecessary umbilical drag.

An additional drawback of typical current and proposed systems is the unnecessary reliance on ship-based controllers. High user interface requirements increase the probability of user-induced errors. Additionally, single-point control will slow data processing, increase system failures, and does not provide adequate corrective measures for corrupted data and/or for defective in-water sources.

Air supply control in the event of gun failure is area where the typical system can be improved. Historically, air supply pressure is distributed among all guns via a common conduit. Failure in a single gun can thus lead to undesirable leakage. U.S. Pat. No. 5,202,669 to Jenkins and assigned to the assignee of this invention address this problem to some extent by providing a remote cut-off valve for controlling air flow among groups of air guns. The Jenkins patent (U.S. Pat. No. 5,202,669) is hereby incorporated herein by reference. Such an air control valve is improved by the present invention in that the present invention provides distributed in-water control to allow the valve incorporation at a gun controller level.

SUMMARY OF THE INVENTION

The present invention addresses the above-identified drawbacks by introducing an upgradeable system having improved and expanded in-water control capabilities.

An apparatus and method according to the present invention provides control of acoustic energy propagation into a body of water. A plurality of acoustic sources is disposed in the body of water, wherein the acoustic energy is propagated into the body of water upon activation of the acoustic sources. A first control module is disposed in the body of water for controlling at least one of the plurality of acoustic sources. A second control module disposed in the body of water and coupled to the first control module, the second control module generates a firing command based on one or more parameters received by the second control module, and an interface device disposed on a tow vessel towing the plurality of acoustic sources is used for transmitting the one or more parameters to the second controller over a high bandwidth telemetry channel. Parameters such as coordinates, and GPS timing signals are contained in one of the in-water control modules for enhancing the system timing.

In another aspect, the acoustic source is a plurality of air guns, and a remote cut-off valve is coupled to one or more air guns to control air flow to the air guns so coupled. The cut-off valve operated to stop air flow to a selected air gun without affecting operation of other air guns. In this manner a firing command can be issued to all air guns and the cut-off valve can be controlled by an in-water control module. The control of the cut-off valve can be a signal sent to valve electronics, which signal is sent simultaneously with a firing command. Thus the selected air gun is issued a firing command, but air flow to the selected air gun is interrupted by the cut-off valve. Such a cut-off valve can be coupled to each air gun individually, or to a plurality of air guns using a manifold. When connected to a plurality of air guns, the cut-off valve preferably includes electronics and internal manifold valves to select among the plurality of air guns.

BRIEF DESCRIPTION OF THE DRAWINGS

The novel features of this invention, as well as the invention itself, will be best understood from the attached drawings, taken along with the following description, in which similar reference characters refer to similar parts, and in which:

FIGS. 1A and 1B show a marine seismic data acquisition system according to the present invention;

FIG. 1C is a system block diagram that represents the system of FIGS. 1A and 1B;

FIG. 1D shows a computer system used for the GUI of the present invention;

DETAILED DESCRIPTION OF THE INVENTION

Figure 2:
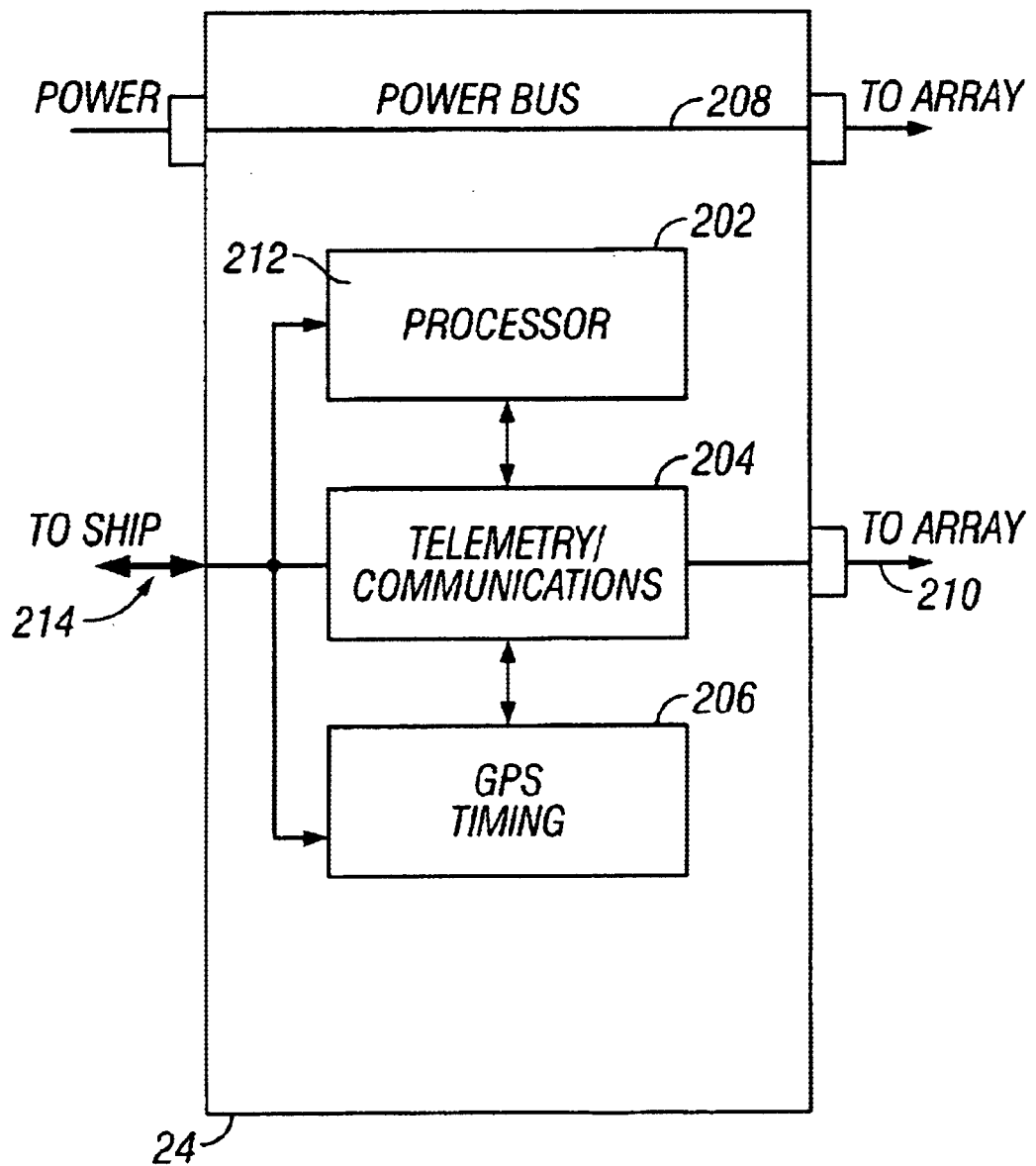
FIG. 2 is a block diagram of an embodiment of the remote control module of the present invention.

FIGS. 1A and 1B show a marine seismic data acquisition system 10. Shown is a tow vessel 12 that includes a central controller 14. As described later, the controller 14 includes a computer and graphical user interface. An air gun array 28 is coupled to the vessel by a reinforced cable 18 and known coupling 26. The cable 18 includes conductors for coupling the array sources to the central controller. The array comprises several individual acoustic sources 16. When activated, each source produces an air bubble 20, and the individual sources are activated such that the several air bubbles coalesce to form a substantially singular acoustic wave 22. An in-water remote control module 24, which will be further described later, preferably controls each array string.

As shown in FIG. 1B, each source comprises several components according to the present invention. Shown are two substantially identical source array strings. Each string includes preferably only one remote control module 24 the array string. Referring to FIGS. 1B and 1C, a source element includes a gun control module 114 for controlling the individual source, a hydrophone sensor 118 for acquiring a near-field response from each source, a depth transducer for acquiring depth information, and a pressure transducer for acquiring pressure information. The depth and pressure transducers being shown collectively as a DT/PT module 120.

FIG. 1C is a system block diagram that represents the system 10 of FIGS. 1A and 1B. The system includes out-of-water (or shipboard) components and towed in-water components. Shipboard components include a user interface computer 102 and a power supply 104. The use of the term "shipboard components" is for simplicity and not indicative of a requirement that any particular component be on a ship. For example, one aspect of the present invention includes a network interface that transmits seismic data to a remote location such as in a land-based office to be viewed on a monitor. The power supply 104 is preferably a known supply used for converting alternating current (ac) power to direct current (DC) power.

The interface 102 and power supply 104 are coupled to in-water components via the umbilical 18. The umbilical 18 is connected to the array 28. The remote control module 24 is coupled via a second umbilical 110 to one or more source elements 16.

In a preferred embodiment, the shipboard interface communicates with a navigation system and provides global synchronization to in-water components to be described later. The shipboard interface provides a data collection point for source array elements and peripheral sensors, and it provides an operator entry point for control of source array elements.

The array 18 includes a plurality of air gun control modules 114 (only one is shown for simplicity), and each gun control module is connected to and controls at least one air gun 116. The gun control module (GCM) is also connected to one or more near field hydrophones 118 and one or more depth/pressure transducers 120 (DT/PT modules). The array may include an optional auxiliary unit 122 when additional DT/PT modules are desired.

FIG. 1D shows a one embodiment of the interface computer 102 of the central controller 14 of the present invention. The interface 102 preferably includes a computer 124, a monitor 126 and a keyboard 128. As in most typical computers, the computer 124 includes an internal processor, memory devices for storing information obtained during the survey and for storing one or more programs having instructions for use by the processor.

FIG. 2 is a block diagram of the remote control module (RCM) 24 used as part of system 10 described above and shown in FIG. 1C. The RCM 24 includes a processor 202, a telemetry communication module 204 and an optional global positioning system (GPS) timing signal receiver 206. In a preferred embodiment, DC power is generated on ship using the power supply 104 as described above and shown in FIG. 1. The RCM 24 preferably passes the DC power using a power bus 208, and the power bus 208 distributes the DC power along the array.

The RCM processor 202 may be any number of known processors and may include a memory module 212 for storing received parameters and data. The processor 202 is coupled to the telemetry module 204. The processor is coupled to the GPS signal receiver 206 for use when precise positioning is necessary as will be discussed later. The telemetry module is coupled to the shipboard interface 102 via a communications link. The telemetry module 204 is also coupled to the processor 202 and GPS receiver 206. All internal couplings are typical electrical couplings known in the art.

Figure 3:
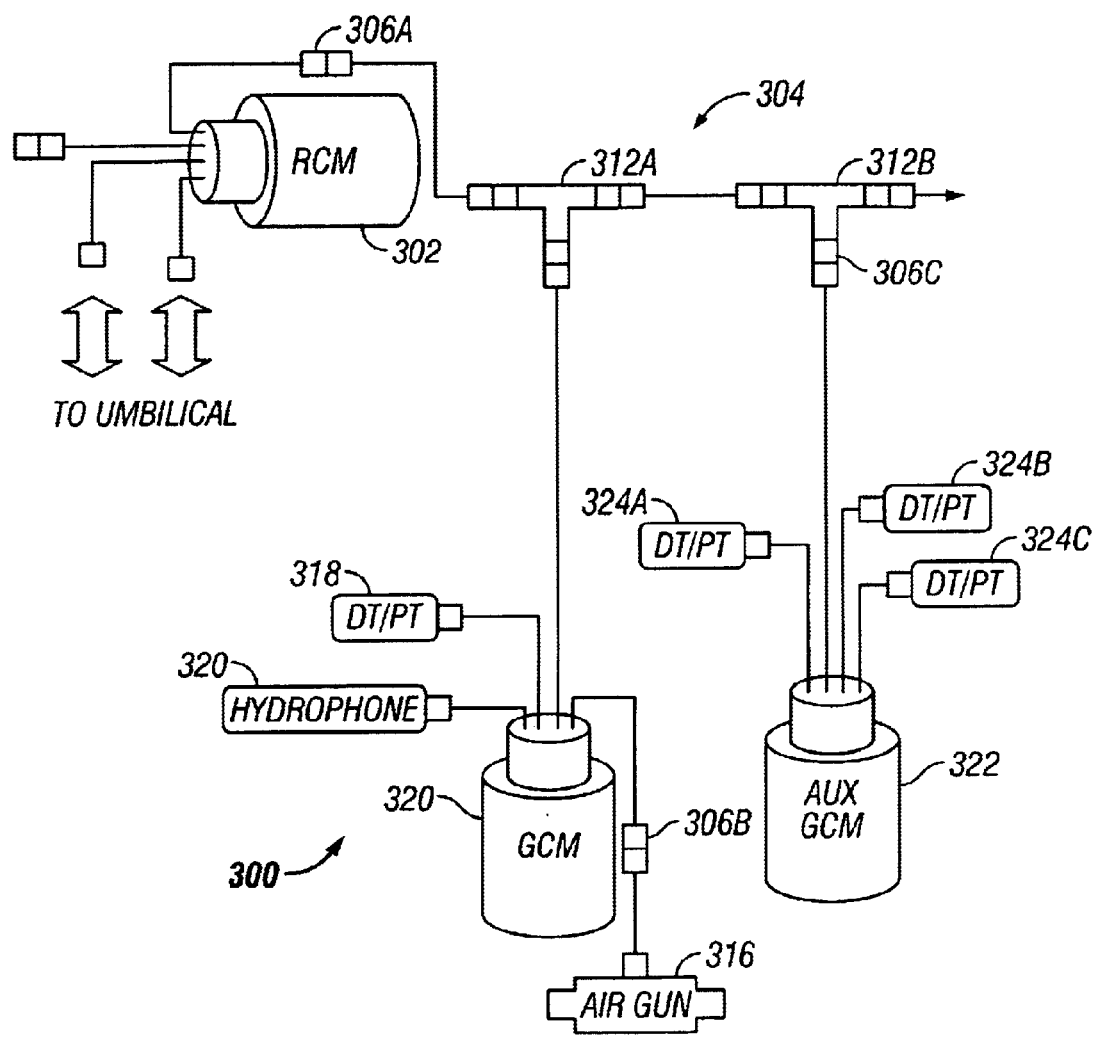
FIG. 3 is a block diagram to show in greater detail the in-water components used in the system of FIG. 1.

FIG. 3 is a block diagram to show in greater detail a preferred arrangement of the in-water components used in the system of FIG. 1. The several components shown in FIG. 3 are referred to collectively as the towed subsystem 300. The towed subsystem 300 includes a remote control module (RCM) 302 substantially identical to the RCM 24 described above and shown in FIGS. 1 and 2. The RCM 302 is coupled to an array 304 using any suitable connector 306a to connect an array umbilical 308. The array umbilical 308 couples the RCM 302 to a plurality of branches 310a–310b using known T-connectors or any other suitable known connector.

A gun branch 310a includes a gun control module (GCM) 314. The GCM 314 is coupled to a known air gun 316. The GCM 314 is coupled to a depth/pressure transducer module 318. The GCM is coupled to a hydrophone 320.

Each GCM is a distributed controller for source array elements. Each GCM includes digitizing circuitry for digitizing signals at or near the acoustic source location. This local digitization reduces adverse noise effects and increases upstream processing capability. In a preferred embodiment, each GCM is used to digitize signals from peripheral sensors elements such as the DT/PT modules.

Each GCM provides power to the source element and acts as a single bus between control units and all source elements, which reduces the number of conductors required for operation.

An auxiliary branch 310b is used to expand the capabilities of the gun branch 310a. As such, the auxiliary branch is completely optional. When used, the auxiliary branch 310b preferably includes an auxiliary GCM 322. The auxiliary GCM is coupled to one or more depth/pressure transducer modules 324a–c. The auxiliary GCM is similar to the GCM in that the auxiliary GCM operates to digitize output signals from the auxiliary branch peripheral sensor elements such as the DT/PT modules 324a–c.

Referring now to FIGS. 1–3 and considering the general description above, one skilled in the art would understand the following additional description and associated advantages realized by the present invention.

The system 100 of the present invention is a scalable 3-stage system that allows an end user to implement portions of the invention while still using existing seismic survey cables and sensors. As existing cables and sensors fail through normal wear and tear, the end user can easily upgrade by adding other advanced system portions according to the present invention.

One embodiment of the present invention is the first stage. The first stage is an in-water control system that provides the ability to extend offset, provide wideband communication between the ship and the in-water remote control unit without making existing in-water hardware obsolete. The first stage of the present invention is provided combining the GCMs 114, RCM 108, shipboard interface 102, and the power supply 104 with known seismic survey sensors and coupling cables.

The first stage provides an umbilical having reduced mass and extended length between the ship and RCM as compared to existing system umbilical couplings that usually extend data communication and a power bus along the entire sub array from the ship controller. The present invention may communicate to the entire array via a twisted pair cable or a fiber optic link from the ship interface to the RCM.

This embodiment, and those to follow, provides greater offset from the ship without creating obsolescence in existing cable inventory. Current umbilical cables are huge and present too much drag in the water. The current system only requires a point-to-point twisted pair conductor in addition to a load-bearing cable and DC power conductor.

Another embodiment is the second stage of the present invention that provides an in-water wide area network (WAN) for gun control. In this embodiment a known network interface card is included in the RCM. The WAN will enhance data communication between in-water gun control modules and between the remote control module and the gun control modules.

Another embodiment of the present invention is the third stage. This embodiment is a system having wide band communication from end-to-end. A fiber-optic communication path along the array and from the remote control module and the ship will reduce system bulk and drag for the tow ship. This wide band system includes autonomous control in the water and provides a simple user interface and capability of communicating data via wireless telemetry from the ship to a land-based central control station.

A shipboard user interface such as a navigational unit coupled to a Remote Control Module (RCM) positioned in the water. The RCM operates as a string header and provides firing control for string GCMs. The initial coupling between the ship an the RCM is a lightweight umbilical comprising twisted pair communication link, a DC power link and a load cable. The RCM couples to Gun Control Modules (GCMs) arranged in an array along the string. Each GCM provides in-water gun control and DT/PT/NFH interface.

The present invention provides scalable evolution from narrow band systems to broadband fiber optic systems. The system allows the use of existing cable communication technology from the RCM to the array with low cost upgrade capability. The present invention provides in-water distributed gun control that reduces the risk of single point failures.

The present invention provides advanced user interface. The shipboard user enters simple parameter data preferably using a Windows™ environment. Parameter data includes timing and synchronization, which reduces the risk of input error.

The RCM establishes synchronization and generates a firing signal to the GCMs after receiving the parameters from the ship navigation system.

In one embodiment, the RCM includes a GPS and the only parameter sent is a set of position coordinates. These coordinates are stored in the RCM. When the RCM determines that the array is positioned according to the coordinates, the RCM generates a firing command and autonomously fires the array.

In a preferred autonomous embodiment, each GCM has a GPS and transmitter or other telemetry system for communicating with the RCM. The GCMs each send real-time coordinates to the RCM. The RCM processor processes the received coordinates to determine the overall array position. In this manner, the RCM calculates the firing command based on the combined data to ensure the several sources are fired simultaneously and in a precise location.

In a preferred embodiment, the Remote Control Module (RCM) operates to provide a functional and mechanical tie point for auxiliary inputs utilizing a single communication bus and supports other auxiliary branch in-array elements. The RCM provides a common interface for converting systems to other communication technologies including balanced wire, fiber, high speed radio, or any other high band width communication method or protocol. The RCM provides redundancy of point-to-point communication across the vessel to RCM link.

In autonomous embodiments, the RCM provides source string autonomy for independent control of multiple arrays of source strings, across several vessels, and remote control stations such as land based stations. This embodiment includes independent control of sub-units within the array, providing autonomous operation in the event of loss of communication to the shipboard system.

The RCM in the several above embodiments provides diagnostic function capability to test all elements of the array. In the event of a gun controller failure or when operation out of safe limits is possible, the RCM will operate to disable the inoperative controller.

The RCM provides offset time and delay control of source elements, globally or independently and provides scalability point to expand the number of Gun Control Modules.

The present invention may also include various embodiments considered within the scope of the invention. Although these alternatives are not expressly described in detail above, the above-described invention would enable one skilled in the art to practice any of variations. Some alternative embodiments are shown in FIGS. 4–7.

Figure 4:
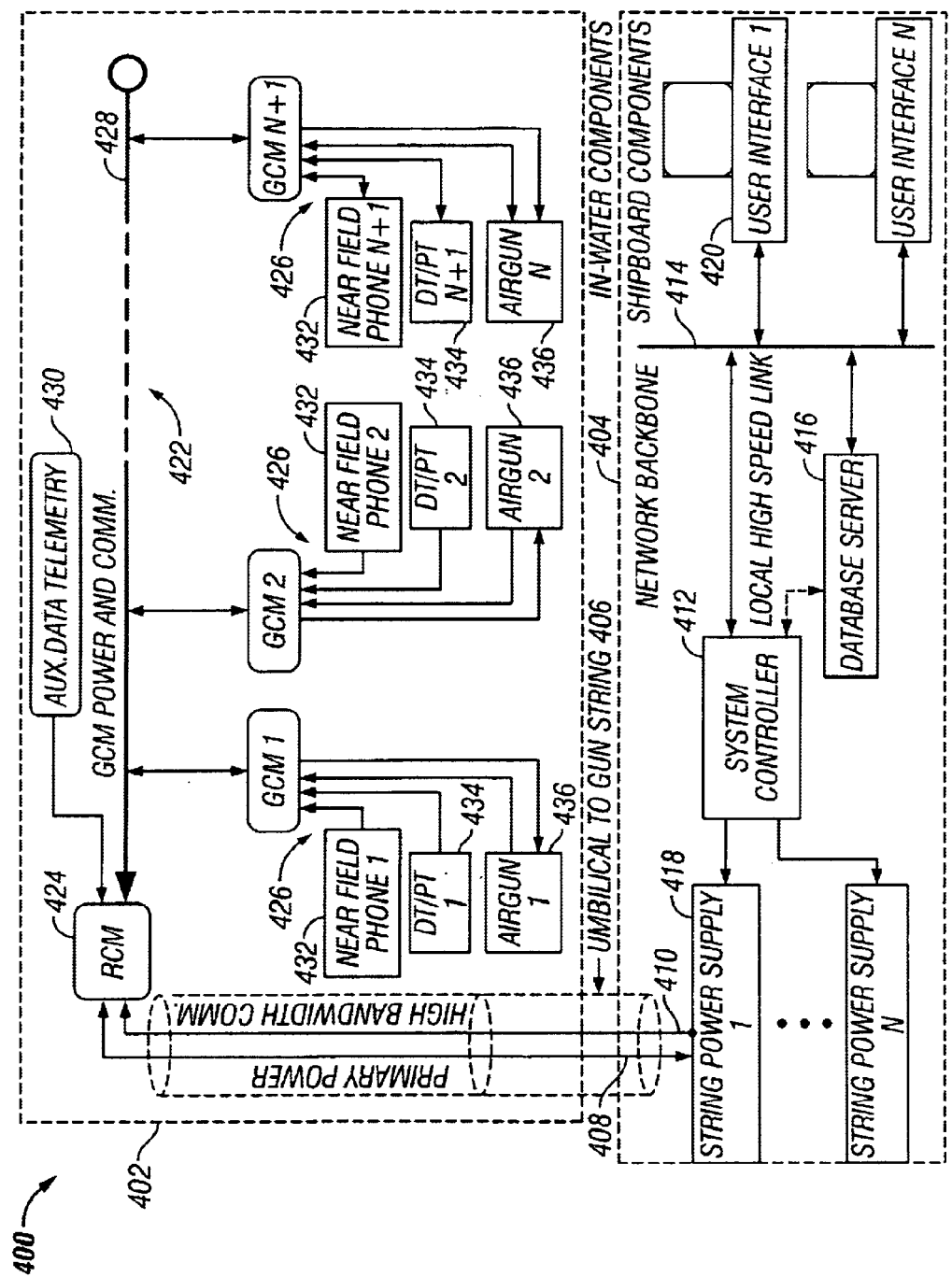
FIG. 4 is a system block diagram of an alternative system embodiment.

FIG. 4 is a system block diagram of an alternative embodiment of a system 400 according to the present invention. The system 400 includes a combination of in-water components 402 and a combination of shipboard components 404 coupled by an umbilical 406. The umbilical 406 preferably provides primary power to the in-water components via a primary power conductor 408. The umbilical 404 further includes a high bandwidth communications link 410 for providing information communication between the in-water components 402 and a shipboard controller 412. The system controller 413 is preferably further coupled to a network backbone 414 and to a database server 416 for support operations. The high bandwidth link 408 preferably includes a fiber optic conduction, but could alternatively include any other high bandwidth conductor.

FIG. 4 further shows other components preferably disposed shipboard. These components are power supplies 418 and user interface devices 420. The power supplies 418 might be a single power supply capable of supplying power to every string associated with the in-water components 412, or there might be multiple (e. g. N) power supplies to provide power to each string. The user interface 420 might likewise be a single interface or multiple interfaces as desired for the particular survey. In a preferred embodiment, each interface 420 includes a monitor and input device. One preferred interface is a known computer such as the computer 102 shown in FIG. 1D.

The network backbone 414 preferably couples all user interfaces to the system controller 412. The network backbone 414 in conjunction with known wireless telemetry techniques is also preferably coupled to off-ship stations such as an on-shore central office. The wireless communication and central office are not shown here for brevity.

The shipboard components 404 are coupled to the in-water components 402 by coupling the umbilical 406 to each string 422 at an RCM 424. Each string 422 is substantially as described above and shown in FIGS. 1A–3. As described above, a string preferably comprises a plurality of sources 426 shown here coupled to the RCM 424 via a power and communications cable 428. Each string source 426 further includes a near field hydrophone 432, depth and pressure transducers shown collectively at 434 and an air gun 436. These components are substantially as described above and do not require further discussion here. The in-water components 402 might also include one or more known components beyond those shown in a typical string 422 according to the present invention. These additional components would preferably couple to the RCM 424 via an auxiliary data telemetry port 430. It would be recognized that variations of source configurations are possible without departing from the present invention. The components of each source are not necessarily required by the present invention to be directly coupled to any particular GCM, so those skilled in the art might reconfigure the locations as necessary when better suit for particular survey and/or customer requirements.

Figure 5:
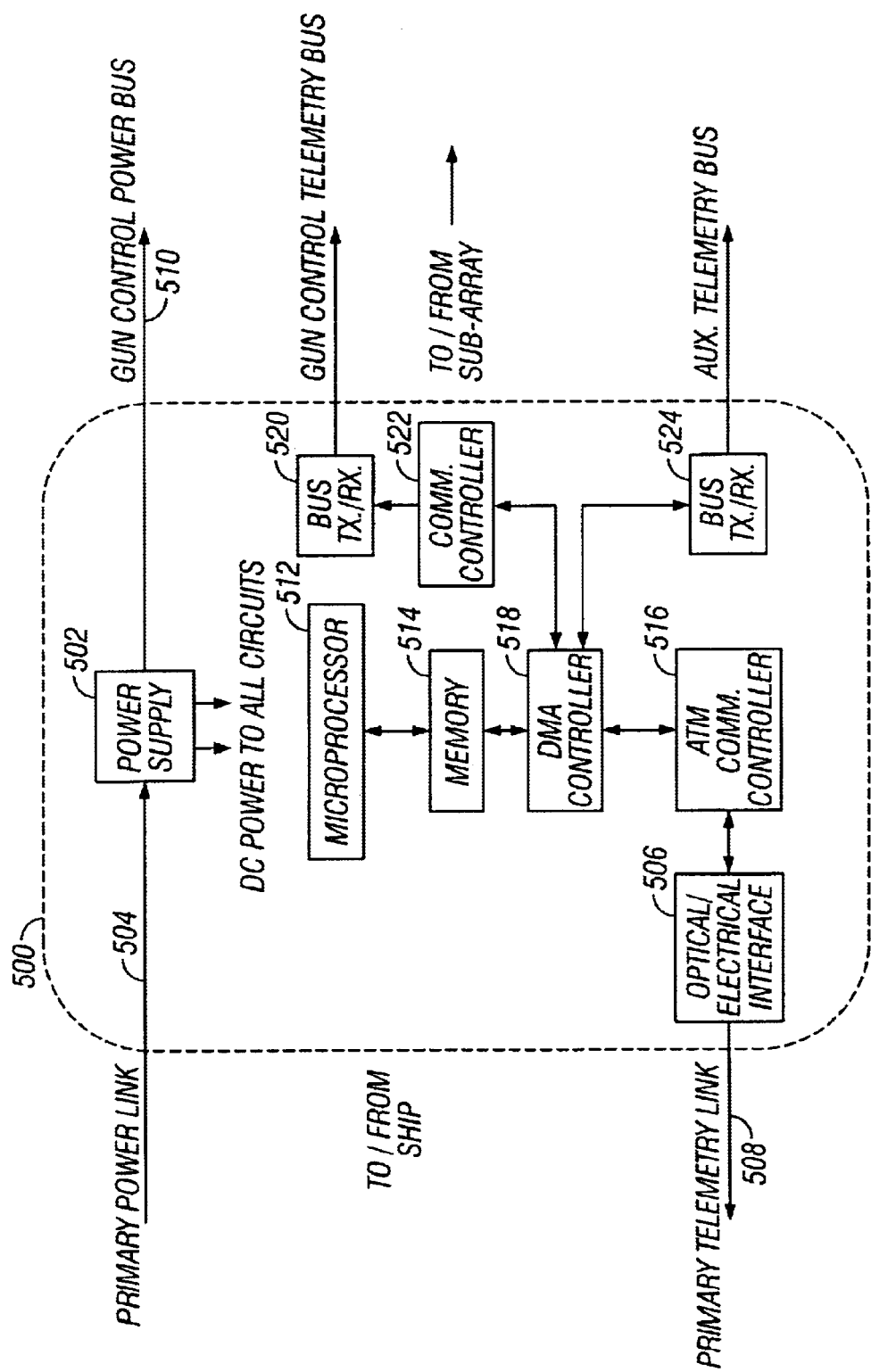
FIG. 5 is a block diagram of an alternative embodiment of the remote control module.

FIG. 5 is a block diagram of an alternative embodiment of a remote control module (RCM) 500 according to the present invention. The RCM 500 includes an internal power supply 502 receiving power from a shipboard power supply 104 over a primary power link 504. The power supply 502 converts main power to lower voltage and current for use by internal RCM circuitry to be described later. The power supply 502 passes supply power to the string (286 of FIG. 1A) via an output power bus 510.

The RCM 500 includes a microprocessor 512 for processing information from the shipboard controller and information received from the string 28. The microprocessor has an associated memory device 514 for storing pre and post processed information. The memory device 514 can be any number of known memory devices, for example magnetic memory, semiconductor, etc . . . An optical/electrical interface module 506 couples the shipboard controller to the RCM 500 using a primary telemetry link 508. The telemetry link 508 preferably includes an optic fiber (not separately shown) for providing a high bandwidth telemetry link. Alternatively, the link 508 can include any number of high bandwidth conductors as well as electrical conductors.

The optical interface 506 is coupled to a circuit for transferring information to the memory device 514. A preferred circuit configuration is an asynchronous transfer mode (ATM) controller 516 coupled to a direct memory access (DMA) controller 518. The ATM 516 and DMA 518 can be obtained from any number of vendors, and are well known.

The RCM 500 preferably includes a circuit for delivering information from the RCM 500 to the string 28. The circuit includes a transmitter/receiver 520 and a communication controller 522 coupled to the DMA controller 518. An auxiliary telemetry bus can be coupled to the RCM 500 using the transmitter/receiver 520 or by using a separate transmitter/receiver circuit 524 coupled to the DMA controller 518.

Figure 6:
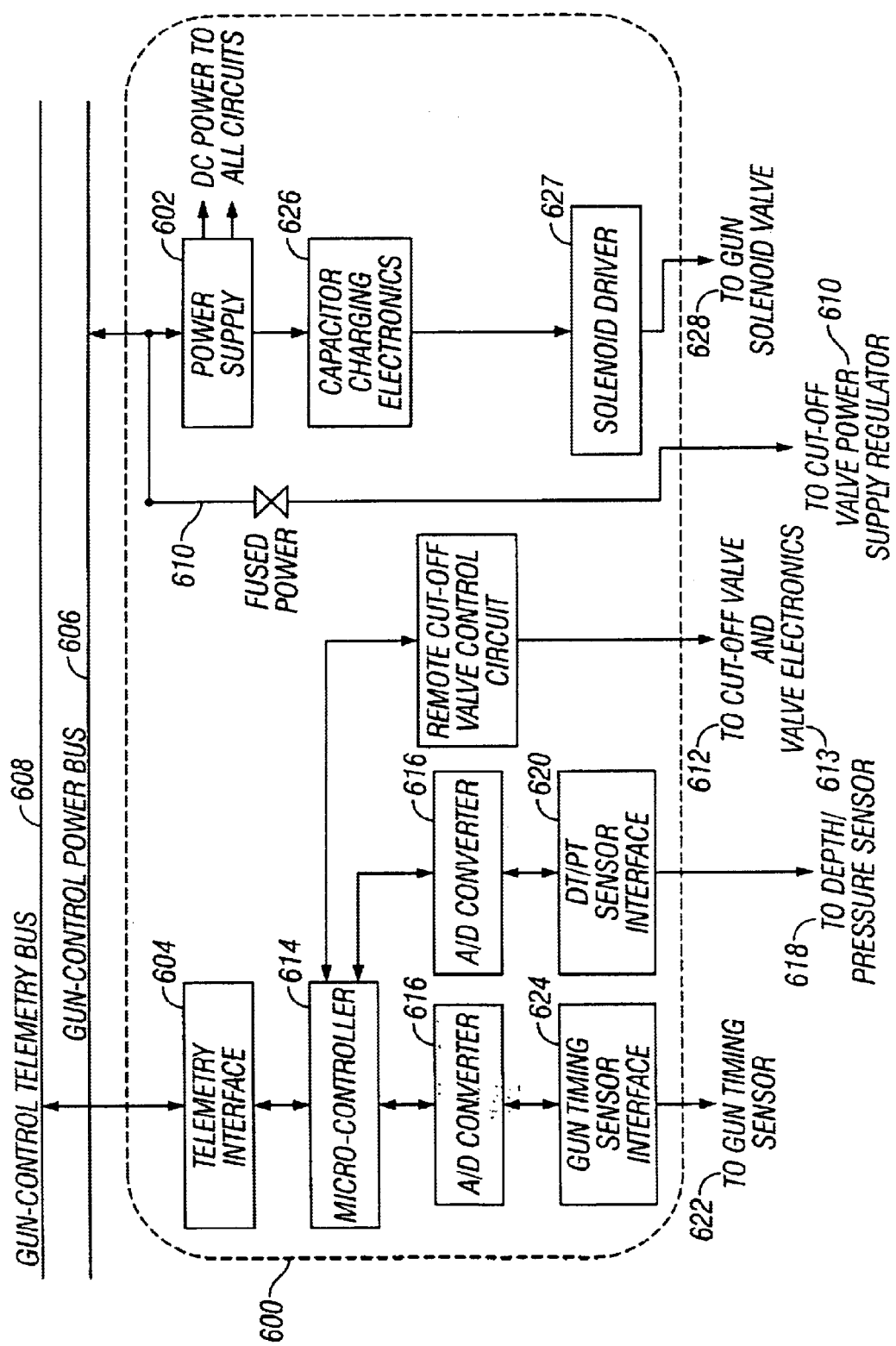
FIG. 6 is a block diagram of an alternative embodiment of the gun control module including a remote cut-off control for use with an air supply cut-off valve.

FIG. 6 is a block diagram of an embodiment showing an arrangement of a module 600 adapted to include control circuits for regulating air supplied to individual guns. In one embodiment the module 600 can be an auxiliary module as described above and shown in FIG. 3. Preferably, the module 600 is a GCM as described above and shown in FIG. 3 with the additional elements as described below. The module 600 includes a power supply 602 and a telemetry interface circuit 604, each being coupled to an RCM via previously described power and telemetry busses 606, 608 respectively. In the embodiment shown, a separate power conductor 610 is coupled to the power bus 606. The separate power supply is preferably separately fused using a fuse or other known circuit interrupter device. The power conductor 610 delivers power to a remote air cut-off valve 612. The cut-off valve 612 general construction is as described in U.S. Pat. No. 5,212,669 to Jenkins, which is fully incorporated herein by reference.

A primary difference between the cut-off valve taught by Jenkins and the valve 612 of the present invention is that the Jenkins valve distributes control over multiple guns and is located upstream of an in-water gun controller. Moreover, the Jenkins valve is controlled completely by the main shipboard controller. The valve 612 of the present invention is either at or downstream of the each GCM and/or Auxiliary module and controls air supply to a gun. The current valve 612 is controlled in a distributed manner using the GCM or Auxiliary module as a control source through an internal microcontroller 614. Thus, the valve 612 provides in-water control to individual guns without affecting operation of the air supply to other guns, even under failure conditions.

The cut-off valve 612 includes an activating circuit 613 which is controlled by a signal from the controller 614.

Preferably, there is a cut-off valve coupled to each air gun and each cut-off valve is individually addressable from the microcontroller 614. In this manner a common firing command can issue to all air guns substantially simultaneously with a control signal sent to a selected cutoff valve. Thus a particular air gun, which might be malfunctioning, can have its air supply interrupted using the selected cut-off valve without affecting operation of the other air-guns commanded to fire. Once activated, a selected cut-off valve continues to block air flow to the affected air-gun to avoid unnecessary air leakage into the water.

Continuing with FIG. 6, the telemetry interface 604 is coupled to the microcontroller 614. The microcontroller is used for local control of, and communication with, the several downstream components of the present invention. The microcontroller 614 is coupled to appropriate A/D converters 616 for communication with DT/PT transducers 618 through a sensor interface circuit 620. The microcontroller 614, through the A/D converter 616, also communicates with a gun timing sensor 622 via a gun timing sensor interface circuit 624. The power supply 602 is used to charge a capacitive charging circuit 626. The charging circuit 626 is coupled to a solenoid driver, which when activated, fire a gun solenoid valve 628.

Figure 7:
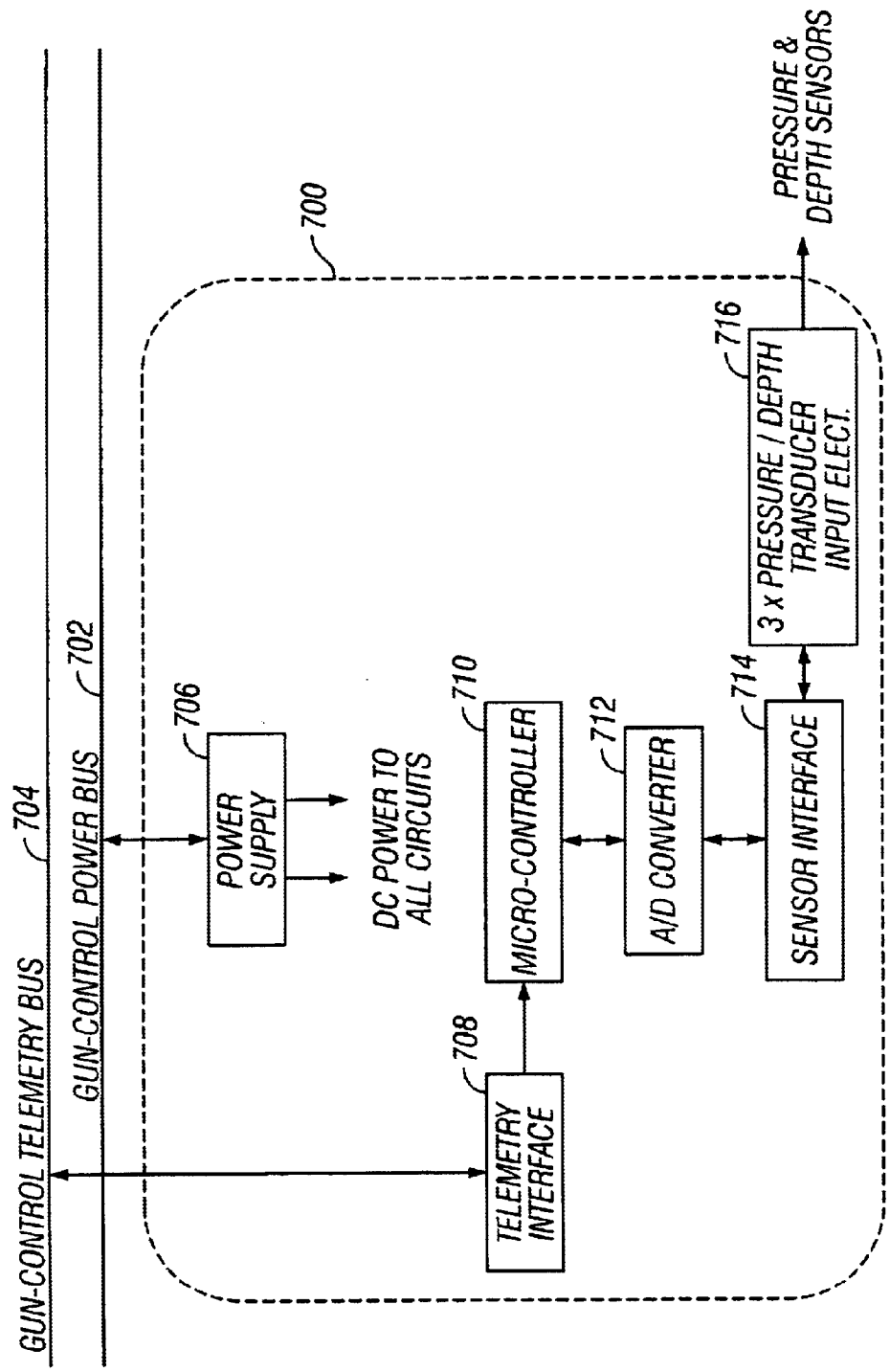
FIG. 7 is a block diagram of an alternative embodiment of an auxiliary module according to the present invention.

FIG. 7 is a block diagram of an alternative embodiment of an auxiliary module 700 according to the present invention. The module 700 is coupled to an RCM 24 by a power bus 702 and an information telemetry bus 704. The busses 702, 704 are substantially as described above and shown in FIGS. 1A–4. Each module 700 preferably includes an internal power supply 706 to convert bus power to voltage and current used by the various circuits described below. A telemetry interface circuit 708 is coupled directly to the information bus 704 and to a microcontroller 710. The microcontroller is coupled to a converter 712 for communicating with a sensor interface circuit 714. The sensor interface circuit 714 is coupled to an input circuit 716 for receiving depth and pressure information from DT/PT transducers not shown here.

Referring to the various embodiments described above and shown in FIGS. 1A–7, a method of distributed control marine seismic survey will be described. In operation a user uses an input device to enter information such as timing and control parameters into the control system. The user can be located shipboard using an on-board user interface or the user can be remotely located using an interface coupled to the system via a network backbone and known wireless communications techniques.

Once entered, the information is transferred to an in-water controller over a high bandwidth communications link. The in-water controller, housed within a remote control module (RCM) uses the transferred information, in conjunction with optional GPS timing information, to command an air gun array by sending firing commands to one or more gun control modules.

Each gun control module receives commands and power via communications and power busses extending along an array umbilical. Each GCM than converts the commands into local firing commands that are created using timing signals associated with an air gun operated by the associated GCM.

The foregoing description is directed to particular embodiments of the present invention for the purpose of illustration and explanation. It will be apparent, however, to one skilled in the art that many modifications and changes to the embodiment set forth above are possible without departing from the scope of the invention. It is intended that the following claims be interpreted to embrace all such modifications and changes.

What is claimed is:

1. An apparatus for propagating acoustic energy into a body of water, comprising:
   a) a plurality of acoustic sources disposed in the body of water, wherein the acoustic energy is propagated into the body of water upon activation of the acoustic sources;
   b) a first control module disposed in the body of water for controlling at least one of the plurality of acoustic sources;
   c) a second control module disposed in the body of water and coupled to the first control module, the second control module generating a firing command based on one or more parameters received by the second control module; and
   d) an interface device disposed on a tow vessel towing the plurality of acoustic sources, the interface device transmitting the one or more parameters to the second control module over a high bandwidth telemetry channel.

2. The apparatus of claim 1, wherein the plurality of acoustic sources comprise air guns.

3. The apparatus of claim 1, wherein one or more of the first and second control modules includes at least one device selected from i) a device containing global positioning system timing information; and ii) a telemetry device for communicating coordinate parameters between the first and second control modules.

4. The apparatus of claim 1 further comprising a first sensor for sensing depth of the first control module and a second sensor for sensing water pressure at the first control module location.

5. The apparatus of claim 4 further comprising an analog to digital converter for converting sensor output analog signals to digital signals.

6. The apparatus of claim 1, wherein the first control module is a plurality of control modules, each of the plurality of control modules controlling one of the sources in the plurality of acoustic sources.

7. The apparatus of claim 6, wherein the second control module is a plurality of control modules arranged in an array and coupled to two or more of the first plurality of control modules.

8. The apparatus of claim 2 further comprising a cut-off valve coupled to the plurality of air guns to control air flow to each of the plurality of air guns, the cut-off valve being controlled at least in part by the first control module.

9. A method of controlling propagation of acoustic energy into a body of water, comprising:
   a) disposing a plurality of acoustic sources in the body of water, wherein the acoustic energy is propagated into the body of water upon activation of the acoustic sources;
   b) controlling at least one of the plurality of acoustic sources using a first control module disposed in the body of water;
   c) generating a firing command from a second control module disposed in the body of water and coupled to the first control module, the firing command being generated based at least in part on one or more parameters received by the second control module; and d) transmitting the one or more parameters to the second control module over a high bandwidth telemetry channel using an interface device disposed on a tow vessel towing the plurality of acoustic sources.

10. The method of claim 9, wherein the plurality of acoustic sources comprise air guns.

11. The method of claim 9 further comprising providing communication between the first control module and the second control module using a telemetry device.

12. The method of claim 9 further comprising communicating coordinate parameters using a telemetry device.

13. The method of claim 9 further comprising transmitting global positioning system timing parameters to at least one of the first control module and the second control module.

14. The method of claim 9 further comprising sensing depth of the first control module using a first sensor and sensing water pressure at the first control module location using a second sensor.

15. The method of claim 14 further comprising converting an analog output of at least one of the first sensor and the second sensor to digital signals for processing.

16. The method of claim 9, wherein the first control module is a plurality of control modules, each of the plurality of control modules controlling one of the sources in the plurality of acoustic sources.

17. The method of claim 16, wherein the second control module is a plurality of control modules arranged in an array and coupled to two or more of the first plurality of control modules.

18. The method of claim 10 further comprising controlling air flow to each of the plurality of air guns using a cut-off valve coupled the plurality of air guns, the cut-off valve being controlled at least in part by the first control module.

* * * * *